Oct. 3, 1933.  L. GUTGELD  1,928,664
CHEESE CAKE PROCESS
Filed Jan. 25, 1932
Fig. 1.
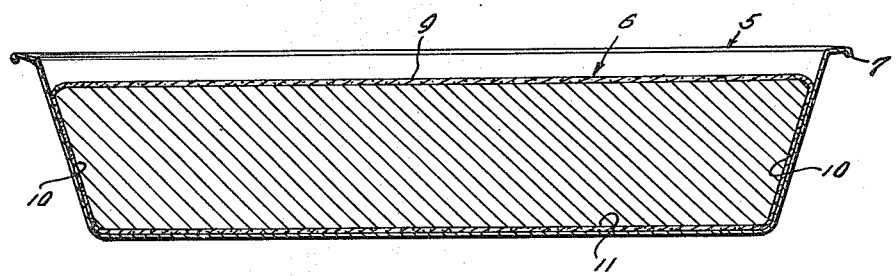
Fig. 2.
Fig. 3.
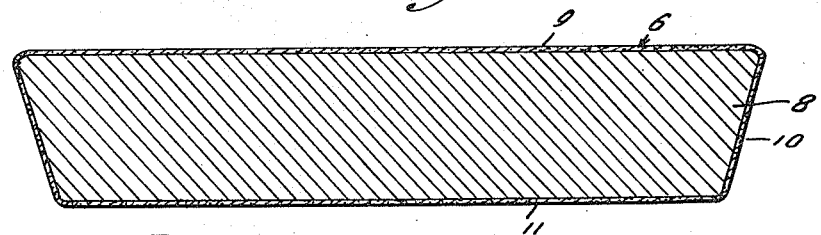
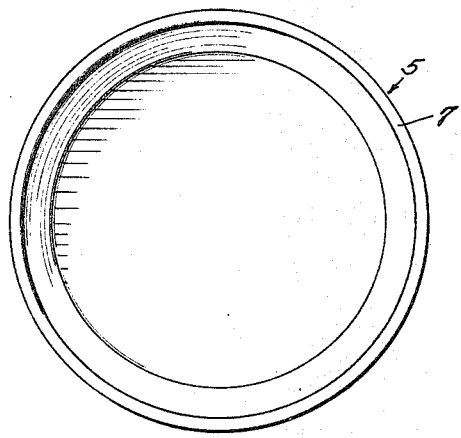
Fig. 4.
Inventor
Leon Gutgeld
By Clarence A. O'Brien
Attorney Patented Oct. 3, 1933

1,928,664

UNITED STATES PATENT OFFICE 1,928,664

CHEESE CAKE PROCESS

Leon Gutgeld, Bronx, N. Y., assignor to Process Holdings, Inc., Cleveland, Ohio, a corporation of Ohio Application January 25, 1932. Serial No. 588,785

1 Claim. (Cl. 99—10)

My invention relates generally to food products of the cheese cake type, and particularly to a new and novel cheese cake and process of making the same.

It is an important object of my invention to provide a considerable shortening of the time required in the baking and finishing of this class of food products, whereby the final cost of manufacture thereof is reduced and larger production made possible without an increase in equipment.

It is also an important object of my invention to provide a novel cheese cake which does not embody a pastry envelope or receptacle, and which is sponge-like in body, thereby producing a new and novel form of edible product different in eating qualities and appearance.

It is also an important object of my invention to provide a cheese cake product of this type which incorporates ingredients not heretofore used in such products.

It is also an important object of my invention to provide a process of making time required for baking and finishing of products of this type is shortened to a period of from 45 to 50 minutes from a period of 2 to 2½ hours, the time ordinarily required.

Another important object of my invention is to provide an improved edible product in the form of the type of pudding commonly called cheese cake having a relatively low density whereby the amount of materials required for the making of a given volume of the product may be economically minimized, without detracting from the delectability of the taste.

It is also an important object of my invention to prescribe a pan or mold having a special wall contour which operates to prevent in a practical manner, the sinking or shrinking of the product as a result of baking the same.

Other objects and advantages of my invention will be apparent from a reading of the following description and the drawing.

In the drawing:—

Figure 1 is a cross sectional view through an embodiment of my invention, showing the cake in the mold or pan.

Figure 2 is a view of the pan prepared to receive the mix.

Figure 3 is a cross sectional view of the finished cheese cake.

Figure 4 is a top plan view of the pan or mold.

Referring in detail to the drawing wherein for purposes of illustration I have shown a preferred embodiment of the invention, and wherein like numerals refer to like parts throughout the same, the numeral 5 refers generally to the mold or pan used by me in molding and baking my cheese cake product 6.

The pan or mold may be circular or in other form and constructed like a shallow pan having the outstanding lip 7 in the upper edge of the walls thereof. The important difference between the pan of my invention and other similar devices, is the divergent angularity of the walls thereof which thereby present non-perpendicular surfaces. Substantially perpendicular walls as usually provided in such devices permit the sinking and shrinking of the product during the baking thereof consequent upon the driving off of the volatile and evaporation products of the heating effect of the baking. In a pan having an inside bottom diameter of about 10½ inches and a top inside diameter of about 12¼ inches and a height of 2⅝ inches, the proper angularity of the walls is provided whereby they are enabled to provide sufficient supporting effect upon the mix placed therein to prevent the sinking and shrinking mentioned.

As seen in the drawing, my improved and novel cheese cake may comprise the center or filler 8, the nature of which is to be described and the light coating 9 of crumbs, preferably butter cookie crumbs or the like on the top and on the sides 10 and the bottom 11 of the finished product. The pan 5 prepared with a coating of such crumbs in the interior thereof is illustrated in Figure 2.

The ingredients of which my product is composed are exemplified in the following particularized embodiment of the invention:—

| | |
|---|---|
| Hoop cheese | 45 lbs. |
| Hard wheat flour | 7 lbs. |
| Salt | 7 oz. |
| Whole eggs | 6 lbs. |
| 20% fresh or sweet cream | 4 quarts |
| 16% sour cream | 4 quarts |
| Milk, skim | 8 quarts |
| Granulated sugar | 15 lbs. |
| Water | 4 lbs. |
| Whites of eggs | 12 lbs. |
| Vanilla flavoring | 5 oz. |

Total 120 lbs. approximately, making twenty seven (27) cakes weighing 4 lbs. 7 oz. each.

The process of my invention is carried out by the preparation of two mixes and the baking.

The first mix is prepared by putting the hoop cheese, the flour, and the salt into a mixing machine in which it is worked for a period of from three to four minutes.

Then, without stopping the mixing machine, there is added the sweet cream, sour cream, the wholes of eggs, the vanilla, and the milk, in any sequence found convenient and without intervals. This is mixed until it runs into a smooth mass.

The second mix is prepared by boiling the sugar with the water until a temperature of approximately 260° F. is reached. While this boiling is going on, it is convenient to beat the egg whites. I then pour the boiled sugar slowly into the egg whites which are in an egg beating machine and without stopping the machine and let it run for about 3 minutes.

The second mix is "folded" into the first mix (not mixed or agitated). The filling is then ready for pouring into the molds to be baked.

The mass or molds 5 are prepared by covering the interior thereof with a coating of grease and the crumbs 9 and the filling then introduced therein. The top covering of crumbs 9 is then sifted upon the top of the molded filling and the mold introduced into the oven and baked for a period of from 45 to 50 minutes.

It will be observed that no fat in any form enters the composition of my improved cheese cake product, and that I introduce into the composition an ingredient which I believe has never been used on such composition prior to my invention, namely, the sour cream. Boiling the sugar is also believed to be entirely new in this connection.

While I have described and shown herein preferred embodiments of my invention, it is to be definitely understood that changes, variations in the quantity, quality and kind of ingredients and in the steps in assembling the same may be made without departure from the spirit of the invention and the scope of the subjoined claim.

What is claimed is:—

The process of making an edible product of approximately hard pudding consistency, comprising the preparation of a cheese batter mix including portions of cheese, flour, salt, and cream, said cream including sour cream, and in further preparing a second mix by adding to the beaten whites of eggs a sugar and water heavy syrup solution at approximately the boiling temperature thereof, i. e. approximately 260° F. while continuing the beating of said egg whites, then folding the second mix into the first mix, then baking the resultant mix in a mold.

LEON GUTGELD.